Figure 1:
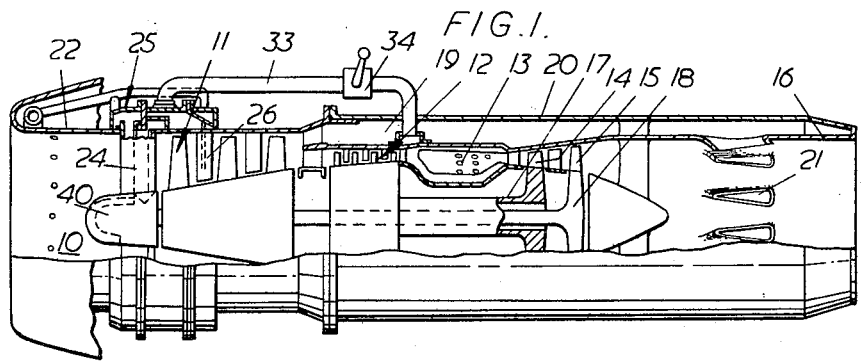

Oct. 9, 1962 W. SHERLAW ET AL 3,057,154
DE-ICER SYSTEM FOR A GAS TURBINE ENGINE
Filed July 7, 1960 2 Sheets-Sheet 1

Inventors
William Sherlaw
& Harry Leheup
By Fred C. Shoemaker
and
Fred L. Witherspoon, Attorneys

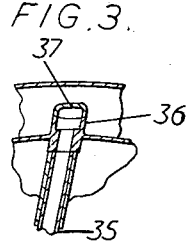
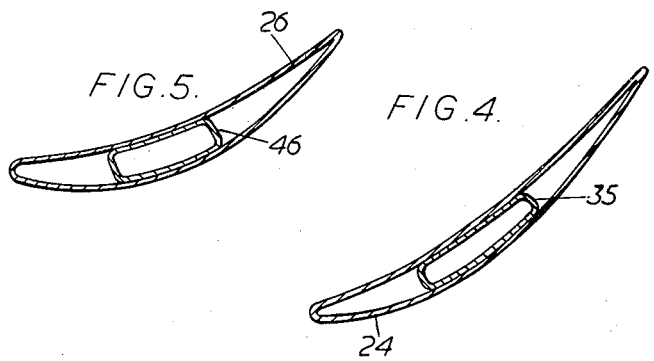
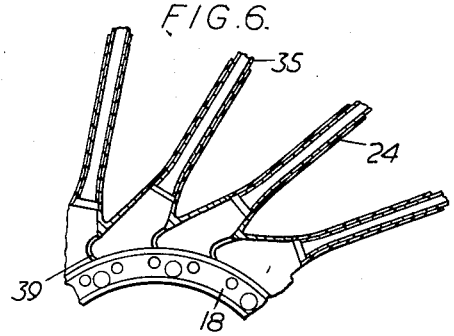

United States Patent Office 3,057,154
Patented Oct. 9, 1962

3,057,154
DE-ICER SYSTEM FOR A GAS TURBINE ENGINE
William Sherlaw, Mapperley, Nottingham, and Harry Leheup, Nottingham, England, assignors to Rolls-Royce Limited, Derby, England, a British company
Filed July 7, 1960, Ser. No. 41,347
Claims priority, application Great Britain July 7, 1959
3 Claims. (Cl. 60—39.09)

This invention concerns gas turbine engines and has for its object the provision of means to prevent the formation of ice on the leading edges of the air intakes of the engines.

According to the present invention there is provided a gas turbine engine comprising ducting means arranged to be supplied with air which has been compressed by the compressor means of the engine and heated thereby, said ducting means being adapted firstly to supply said heated air to, so as to heat the interior of compressor blading of the engine and/or of a strut extending across the air intake of the engine, and thereafter to supply said heated air to, so as to effect heating of, the leading edge of the air intake.

The said compressor blading may comprise the first stage stator blades of the compressor means while the said compressor means may comprise a low pressure and a high pressure compressor, the ducting means being arranged to be supplied with air from the downstream end of the high pressure compressor.

Preferably the arrangement is such that air from the downstream end of the high pressure compressor is conveyed to an annular manifold surrounding the upstream end of the low pressure compressor, the air in the manifold being caused to flow down the centre of tubes, each of which is provided in an air intake strut, and down the interior of the leading edge of each first stage stator blade, a portion of the air after flowing down the tubes being caused to flow up the interior of the leading and trailing edges of the intake struts and being exhausted into a first annular chamber, the remainder of the air flowing down the tubes being used to heat a bullet-shaped baffle in the air intake of the engine, the air after flowing down the leading edge of the stator blades being caused to flow up the interior of the trailing edges of these blades and being exhausted into a second annular chamber, the first and second annular chambers being connected to a conduit communicating with an annular manifold provided within the interior of the leading edge of the air intake, said manifold having apertures for directing the hot air delivered to the manifold from said first and second chambers onto the inner surface of the leading edge of the air intake to heat it.

Preferably means are provided for returning the heated air, which has been used to heat the leading edge of the air intake, into the intake duct of the engines.

Figure 2:
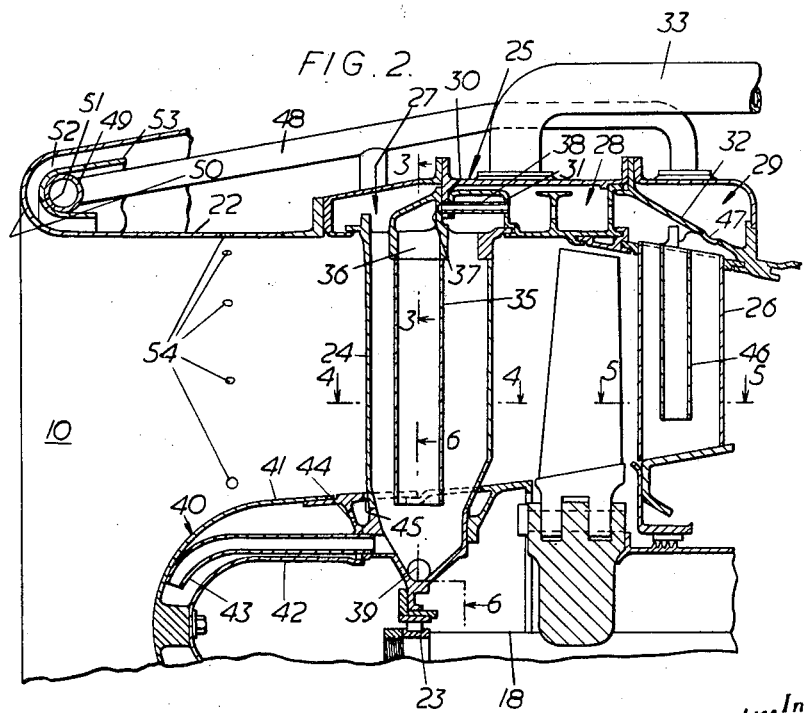

The invention is illustrated, merely by way of example, in the accompanying drawings, in which:

FIGURE 1 is an elevation, partly in section, of a gas turbine, jet reaction engine of the by-pass type embodying the present invention, FIGURE 2 is a sectional elevation of part of the engine shown in FIGURE 1, and FIGURES 3, 4, 5, 6 are sections taken respectively on the lines 3—3, 4—4, 5—5 and 6—6 of FIGURE 2.

In FIGURE 1 there is shown a gas turbine, jet-reaction engine of the by-pass type for use in propelling an aircraft. The engine comprises in flow series an air intake duct 10, a low pressure compressor 11, a high pressure compressor 12, combustion equipment 13, and high and low pressure turbines 14, 15 respectively. The exhaust gases from the turbines 14, 15 are directed through a jet pipe 16.

The high pressure turbine 14 drives the high pressure compressor 12 through a shaft 17, whilst the low pressure turbine 15 drives the low pressure compressor 11 through a shaft 18 which is concentric with and mounted within the shaft 17.

The upstream, or inlet, end of an annular by-pass duct 19, one of whose walls is provided by an engine casing 20, communicates with a space between the low and high pressure compressors 11, 12. The by-pass duct 19 thus obtains a supply of compressed air from the low pressure compressor 11. The compressed air flowing through the by-pass duct 19 by-passes the high pressure compressor 12, the combustion equipment 13, and the high and low pressure turbines 14, 15. The by-pass air is discharged through apertures 21 into the jet pipe 16 so as to mix therein with the turbine exhaust gases.

The intake duct 10 is provided within an air intake casing 22, the upstream end of the shaft 18 being journalled within bearings 23 which are supported from the casing 22 by hollow, vane-shaped struts 24. The struts 24 (see FIGURE 6) are arranged tangentially of the shaft 18 so as to minimise the risks of their buckling when heated.

An annular manifold 25 is mounted about the portion of the casing 22 which surrounds the air intake struts 24 and the first stage stator blades 26 of the low pressure compressor 11. The manifold 25 is divided into an upstream chamber 27, a central chamber 28, and a downstream chamber 29. The chambers 27, 28 are separated from each other by walls 30, 31 while the chambers 28, 29 are separated from each other by a wall 32.

A duct 33, incorporating a shut-off cock 34, communicates with the downstream, or outlet, end of the high pressure compressor 12 and also with the central chamber 28. The cock 34 may be manually controlled or may be automatically controlled, e.g. by temperature responsive means. When the cock 34 is open, air which has been heated by passing through the low and high pressure compressors 11, 12 will be supplied to the central chamber 28.

Extending centrally of each of the air intake struts 24 is a tube 35 whose radially inner end is spaced from the inner end of the respective strut 24. The radially outer end of each tube 35 communicates with the interior of a cap member 36 which is disposed partly within the manifold 25 and partly within the respective strut 24. Each cap member 36 has an aperture 37 therethrough which communicates with the central chamber 28 by means of a tube 38 mounted in the walls 30, 31.

Some of the heated air from the central chamber 28 will thus flow through the tube 38 and then flow radially inwardly through each tube 35 and will then divide so as to flow radially outwardly over the leading and trailedges of the respective strut 24 and so into the upstream chamber 27.

The inner ends of the struts 24 are contiguous and communicate with each other by holes 39 which ensure that the pressures within the various struts are the same.

Immediately upstream of the struts 24 is a bullet-shaped, double walled, air intake baffle 40 which serves to form the air flowing through the air intake duct 10 into an annular stream suitable for passage through the compressor 11. Mounted between the inner and outer walls 41, 42 of the baffle 40 are a plurality of tubes 43 each of which communicates with the interior of a respective strut 24.

Heated air from the inner end of each strut 24 may thus flow through a tube 43 and over the walls 41, 42. This air will then flow out into the air intake duct 10 through apertures 44, 45 formed in wall members of the baffle 40.

Each of the stator blades 26 is hollow and has mounted within it a tube 46 whose radially inner end is spaced from the radially inner end of the respective blade 26. Heated air from the chamber 28 may flow radially inwardly over the leading edge of the blade 26. The tube 46 serves as a baffle and the heated air passes radially outwardly up the trailing edge of the blade 26 and so into the downstream chamber 29 via holes 47 in the wall 32.

A duct 48 communicates with the chambers 27, 29 and with a manifold 49 disposed adjacent the leading edge 50 of the air intake casing 22. The manifold 49 has ports 51 communicating with a channel 52 formed between the upstream portion of the casing 22 and a baffle 53. Heated air, after it has been used to heat the struts 24 and blades 26, is thus passed to the channel 53 whereby to heat the leading edge 50, the air being subsequently returned to the air intake duct 10 via holes 54 in the casing 22.

The contruction shown in the drawings thus provides an economical way of heating the blades 26, struts 24, baffle 40 and leading edge 50 of the air intake so as to prevent icing up of these parts.

Alternatively the holes 54 may be omitted and the air ejected overboard after heating the leading edge 50.

We claim:

1. A gas turbine engine comprising in flow series an air intake, low pressure and high pressure compressor means, said compressor means comprising first stage stator blades, combustion equipment, and turbine means, shaft means carrying said compressor means and turbine means, a bullet shaped baffle in said air intake, a plurality of hollow struts mounted within the air intake and serving to support said baffle and said shaft means, ducting means communicating with the downstream end of the high pressure compressor means and supplied with air which has been heated thereby, an annular manifold and first and second annular chambers surrounding the upstream end of the low pressure compressor, a plurality of tubes each of which is provided in an air intake strut, an annular manifold provided within the interior of the leading edge of the air intake, a conduit communicating with the leading edge manifold and with the first and second annular chambers, said duct being connected to supply hot air to said annular manifold, means directing air from the annular manifold to flow down the center of the tubes and down the interior of the leading edge of each first stage stator blade, means causing a portion of the air after flowing down the tubes to flow up the interior of the leading and trailing edges of the intake struts for exhaust into the first annular chambers, means directing the remainder of the air flowing down the tubes to heat the bullet-shaped baffle, means directing the air after flowing down the leading edge of the stator blades to flow up the interior of the trailing edges of these blades and into the second annular chamber, the leading edge manifold having apertures for directing the hot air delivered to it from said first and second chambers onto the inner surface of the leading edge of the air intake to heat it.

2. A gas turbine engine comprising casing means, compressor means, combustion equipment and turbine means connected in flow series and mounted within said casing means; said casing means including a forward annular air intake portion; a nose bullet in said casing portion defining therewith an air intake for the gas turbine engine; a plurality of air intake struts rearwardly of the leading edge of the casing portion interconnecting the latter and said nose bullet; means providing within each of said air intake struts a radially inward flow passage and an adjacent radially outward flow passageway, both extending throughout the length of said air intake struts and communicating at their radially innermost ends; a first annular manifold arranged about said casing means and communicating with said inward flow passageways; duct means connecting said compressor means to said manifold whereby compressed air flows radially inwardly and then radially outwardly through said passageways; a second annular manifold arranged about said casing means and communicating with said radially outward flow passageways to receive compressed air therefrom; a third annular manifold arranged about the forward end of said air intake casing portion adjacent the leading edge thereof and receiving compressed air from said second annular manifold, said third manifold having discharge outlet means adapted to discharge compressed air to impinge against the inner surface of said leading edge of the air intake casing portion; said compressor having a plurality of angularly spaced first stage stator blades, means providing within each of said stator blades a fluid flow passageway, and a fourth annular manifold arranged about said casing means and communicating with said last-mentioned fluid flow passageways, said fourth annular manifold also receiving compressed air from said duct means which then flows through the fluid flow passageways in said stator blades.

3. A gas turbine engine comprising an air intake, a low pressure compressor having first stage stator blades, a high pressure compressor, combustion equipment, and turbine means connected in flow series, shaft means carrying said compressors and turbine means, a plurality of hollow struts mounted within the air intake, a nose bullet in the air intake supported by said struts, said nose bullet supporting said shaft means, a tube in each air intake strut, an annular manifold and first and second annular chambers surrounding the upstream end of the low pressure compressor, a leading edge annular manifold in the interior of the leading edge of the air intake, a conduit communicating with the leading edge manifold and with the first and second annular chambers, means for directing air from the downstream end of the high pressure compressor to the said annular manifold, means directing the air in the latter manifold to flow inwardly through said tubes and inwardly through the interior of the leading edges of said first stage stator blades, said intake struts being partially closed at their inner ends whereby a portion of the air after flowing down the tubes is directed outwardly through the interior of the leading and trailing edges of said struts for exhaust into the first annular chamber, means to direct the remainder of the air flowing down the tubes into the nose bullet to heat the same, means directing the air after flowing inwardly through the leading edges of said stator blades to flow outwardly through the interior of the trailing edges of these blades for exhaust into the second annular chamber, said leading edge manifold having apertures for directing the hot air delivered to it from said first and second annular chambers onto the inner surface of the leading edge of the air intake to heat it.

References Cited in the file of this patent

UNITED STATES PATENTS

| | | |
|---|---|---|
| 2,594,118 | Boyd | Apr. 22, 1952 |
| 2,600,302 | Kinsella | June 10, 1952 |
| 2,618,120 | Papini | Nov. 18, 1952 |
| 2,655,308 | Luttman | Oct. 13, 1953 |
| 2,712,727 | Morley et al. | July 12, 1955 |

FOREIGN PATENTS

| | | |
|---|---|---|
| 200,323 | Australia | Dec. 23, 1954 |
| 637,598 | Great Britain | May 24, 1950 |